United States Patent

Curnow

[15] 3,683,958
[45] Aug. 15, 1972

[54] POWER TRANSMISSION
[72] Inventor: John W. Curnow, Utica, Mich.
[73] Assignee: Sperry Rand Corporation, Troy, Mich.
[22] Filed: Nov. 30, 1970
[21] Appl. No.: 93,616

[52] U.S. Cl. .................................................137/489
[51] Int. Cl. .................................................F16k 17/02
[58] Field of Search ..............................137/488, 489

[56] References Cited

UNITED STATES PATENTS

| | | | |
|---|---|---|---|
| 2,619,111 | 11/1952 | Renick | 137/489 |
| 3,250,293 | 5/1966 | Adams et al. | 137/489 |
| 3,526,241 | 9/1970 | Veit | 137/489 X |

Primary Examiner—Henry T. Klinksiek
Attorney—Van Meter and George

[57] ABSTRACT

A fluid pressure relief valve has a pilot chamber, the pressure in which may be varied to determine the level at which the valve will open. A pilot flow path extends from the inlet through the pilot chamber to the outlet and has restrictions, both upstream and downstream, from the pilot chamber. The downstream restriction is pressure compensated to maintain a fixed rate of flow out of the pilot chamber. Upstream there is a fixed restriction and an electromagnetically variable restriction which enables the pressure at which the valve will open to be adjusted electrically to any value over a continuous range.

5 Claims, 1 Drawing Figure

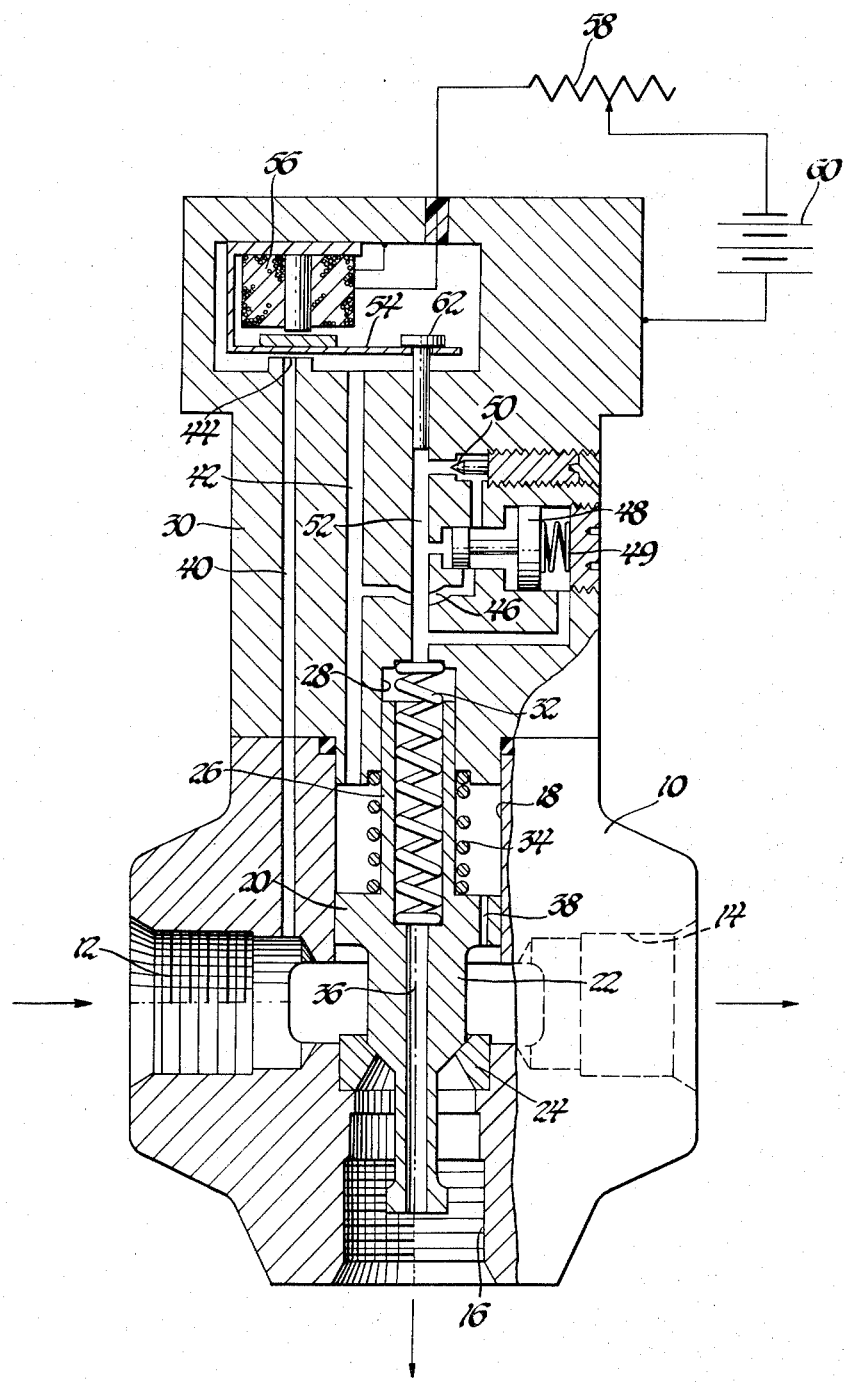

POWER TRANSMISSION

Pilot controlled relief valves are widely used as pressure limiting devices in high pressure fluid systems, such for example as hydraulic power circuits, due to their reliability and ease of adjustment. By varying the compression of the spring on a small pilot valve and by using a pressure actuated piston, they avoid the need for a large spring controlling the main or primary relief valve. However, even the lighter spring of the pilot valve is still much too heavy to be capable of adjustment by electromagnetic means of reasonable size and cost.

It is accordingly an object of the present invention to provide a pilot controlled relief valve which incorporates a simple, reliable, and low cost electromagnetic means for varying the pressure setting at which the relief valve will open.

This objective is accomplished by the provision of a valve comprising a body having an inlet port and an exhaust port, a slidable primary valve which controls flow therebetween, a pilot chamber formed in the body, a slidable piston connected to the primary valve and exposed on one side to inlet pressure and on the other side to pressure in the pilot chamber, means for establishing a pilot flow from the inlet port to the exhaust port via the pilot chamber including restrictions upstream and downstream of the pilot chamber, and electromagnetic means for varying one of the restrictions to modulate the pressure in the pilot chamber to any pre-selected value whereby the pressure level at which the primary valve will open will vary with the degree of energization of the electromagnetic means.

In the drawing:

The single FIGURE is a diagrammatic representation of a pilot controlled relief valve incorporating a preferred form of the present invention.

The body 10 has an inlet port 12, and an extension thereof indicated at 14, and an outlet port 16. The body 10 incorporates a pilot chamber 18 in which is slidably mounted a piston 20 forming part of a main or primary valve 22 which normally closes flow through a seat 24 between the inlet 12 and the outlet 16. The piston 20 has a tubular extension 26 of the same diameter as the effective diameter of seat 24 and this extension slides in a bore 28 in a cap member 30 which is secured by bolts, not shown, to the body 10. Springs 32 and 34 urge the valve 22 against the seat 24. A central passageway 36 connects the interior of bore 28 with the outlet 16. The structure thus far described is typical of pilot controlled relief valves which may take many other forms than the one herein shown.

The primary valve 22 is held on its seat by the springs 32 and 34 aided by the hydraulic pressure which exists in the pilot chamber 18. These forces oppose the lifting force which is exerted on the underside of the piston 20 by the fluid pressure existing at the inlet 12. For the purpose of variably determining the pressure level at which the valve 22 will open, means is provided for variably determining the pressure level in the pilot chamber 18. Thus, a small flow path is provided from the inlet 12 to the outlet 16 with the pilot chamber 18 connected to an intermediate point in that path. This path includes two inlets to the chamber 18, namely a passage 40–42 which includes a variable orifice at 44 and a fixed restriction 38 through the piston 20. The restriction 38 may be omitted, but is preferred for improving the sensitivity of the system. The outlet or downstream path from pilot chamber 18 includes a branch passage 46 extending from passage 42, a pressure compensating valve 48 and a fixed but adjustable restriction 50 leading to a passage 52. The compensator 48 maintains a constant pressure drop (determined by the spring 49) across the restriction 50 and thus maintains a constant flow rate from passage 46 to passage 52 independently of the pressure difference between the pilot chamber 18 and the exhaust port 16. Passage 52 leads to the exhaust port 16.

For the purpose of controlling the orifice 44, an electromagnetically actuated flapper valve 54 is provided which is controlled by means of an electromagnetic structure 56. Depending upon the degree of energization thereof, the flapper 54 will variably open or restrict the orifice 44. The energization thereof may be determined in the customary manner, such as by a variable resistance 58 controlling the supply from a D.C. source 60. A stabilizing piston 62 acts to counteract the magnetic force on the blade 54 in response to the pressure excess at the outlet of orifice 44 and passage 52 over the pressure in the exhaust port 16.

In operation, at a given setting of the variable resistance 58, the flapper 54 will maintain a predetermined clearance at the orifice 44. A small continuous pilot flow takes place from the inlet 12 to the outlet 16 via passage 40, valve 44, passages 42, and 46, compensator 48, orifice 50, and passages 52, and 36. Optionally, a parallel flow occurs through passage 38, chamber 18 and the lower part of passage 42 to passage 46. Bearing in mind that the flow through orifice 50 is maintained at a constant rate by the compensator 48, the pressure level in the pilot chamber 18 will then be determined by the pressure drop which occurs as a result of flow through the two restricted paths 38 and 44 when their total flow equals the flow through the restrictor 50. Whenever the inlet pressure tends to exceed the value determined by the pressure in pilot chamber 18 plus the force of the springs 32 and 34, this inlet pressure exerted on the bottom face of piston 20 will lift valve 22 and relieve fluid to the exhaust port 16.

When it is desired to increase the pressure at which valve 22 will open, the energization of the electromagnetic structure 56 is increased by adjusting the resistor 58, thus tending to open the orifice 44 and raise the pressure in pilot chamber 18. Correspondingly, a reduced pressure setting may be achieved by reducing the energization of the electromagnetic structure 56. Thus, any desired pressure setting may be achieved over a continuous range of values by merely adjusting the variable resistor 58 which, of course, may be done manually or automatically and either locally or at a distance.

I claim:

1. A pilot controlled relief valve comprising a body having an inlet port and an exhaust port, a slidable primary valve controlling flow therebetween, a pilot chamber formed in the body, a slidable piston connected to the primary valve and exposed on one side to inlet pressure, means for establishing a pilot flow from the inlet port to the exhaust port, first and second restriction means for restricting said pilot flow, means for establishing a pressure level in the pilot chamber which varies with the pressure intermediate the two restrictions, electromagnetic means for varying one of the restrictions to modulate the pressure in the pilot chamber to any preselected value, and stabilizing means responsive to the pressure intermediate the two restrictions for variably biasing the electromagnetic means whereby the pressure level at which the primary valve will open will vary with the degree of energization of the electromagnetic means.

2. A valve as defined in claim 1 wherein one of the restrictions is pressure compensated to maintain a fixed rate of flow therethrough.

3. A valve as defined in claim 1 wherein the electromagnetic means includes a flapper blade and the associated restriction is constituted by an orifice facing the blade.

4. A pilot controlled relief valve comprising a body having an inlet port and an exhaust port, a slidable primary valve controlling flow therebetween, a pilot chamber formed in the body, a slidable piston connected to the primary valve and exposed on one side to inlet pressure and on the other side to pressure in the pilot chamber, a first orifice of variable size connected between the inlet port and the pilot chamber, a pressure compensated flow controller connected between the pilot chamber and the exhaust port, and means for varying the size of the first orifice to thereby modulate the pressure in the pilot chamber to any selected level and thus allow the primary valve to open at a related pressure level in the inlet port.

5. A valve as defined in claim 4 wherein an electromagnetically controlled armature is provided to control the size of the first orifice.

* * * * *